United States Patent
Edwards

(10) Patent No.: US 8,767,923 B1
(45) Date of Patent: Jul. 1, 2014

(54) EMERGENCY COMMUNICATION WITHIN CONTROLLED-ENVIRONMENT FACILITIES

(75) Inventor: Adam Christopher Edwards, Fort Worth, TX (US)

(73) Assignee: Securus Techologies, Inc., Dallas, TX (US)

( * ) Notice: Subject to any disclaimer, the term of this patent is extended or adjusted under 35 U.S.C. 154(b) by 90 days.

(21) Appl. No.: 13/273,441

(22) Filed: Oct. 14, 2011

(51) Int. Cl.
*H04M 11/04* (2006.01)
*H04M 1/725* (2006.01)
*H04M 3/22* (2006.01)

(52) U.S. Cl.
CPC ........ *H04M 1/72536* (2013.01); *H04M 3/2281* (2013.01)
USPC .......................................... 379/39

(58) Field of Classification Search
CPC ................... H04M 1/72536; H04M 3/2281
USPC ...................................... 379/48, 39
See application file for complete search history.

(56) References Cited

U.S. PATENT DOCUMENTS

| 2004/0176066 A1* | 9/2004 | Binzel et al. ............... 455/404.1 |
| 2011/0110276 A1* | 5/2011 | Rae .............................. 370/260 |
| 2013/0029630 A1* | 1/2013 | Salkini et al. ............. 455/404.1 |

* cited by examiner

*Primary Examiner* — Alexander Jamal
(74) *Attorney, Agent, or Firm* — Fogarty, L.L.C.

(57) ABSTRACT

Systems and methods for providing emergency communications within controlled-environment facilities are disclosed. In some embodiments, a method may include providing a communication platform. The communication platform may be configured to, in a first mode of operation, enable communications between devices (e.g., telephones, etc.) operated by residents (e.g., inmates, etc.) of a controlled environment facility (e.g., jail, prison, etc.) and devices (e.g., telephones, etc.) operated by non-residents of the controlled environment facility. The method may also include switching the communication platform from the first mode of operation to an emergency mode of operation. In the emergency mode of operation, the communication platform may be configured to enable an emergency communication from a first device operated by a resident of the controlled environment facility to a second device controlled by emergency response personnel (e.g., hostage negotiator, counselor, police officer, etc.).

19 Claims, 3 Drawing Sheets

EMERGENCY COMMUNICATION WITHIN CONTROLLED-ENVIRONMENT FACILITIES

TECHNICAL FIELD

This specification relates generally to communications systems within controlled-environment facilities and, more particularly, to communications during emergency situations.

BACKGROUND

Inmates incarcerated within U.S. prisons and other types of controlled-environment facilities are potentially subject to violence on a daily basis. In some cases, a single violent act may target a specific prisoner. For example, a hostage situation may develop within the prison between a captor and another inmate, prison staff, visitor, etc.

In other cases, violence may be caused by and/or otherwise affect a relatively larger portion of the inmate population, resulting in bodily harm or death to its victims as well as significant property damage to the prison. For example, in 2006 at the North County Correctional Facility in California, a riot resulted in one inmate killed and over one hundred injured. On Aug. 21, 2009 at the Northpoint Training Center in Kentucky, an inmate uprising involving approximately 80 inmates resulted in 5 buildings completely burned down.

Despite these types of events, communication systems deployed within prisons are generally not suited for handling emergency situations. For example, inmate telephones within prisons do not have access to 911 services, often cannot be used to directly connect inmates to prison administration or response personnel, and are also not capable of receiving inbound calls. In light of these, and other identified concerns, the inventors hereof have recognized a need for providing emergency communications within controlled-environment facilities.

SUMMARY

Embodiments disclosed herein are directed to systems and methods for providing emergency communications within controlled-environment facilities. In an illustrative, non-limiting embodiment, a method may include providing a communication platform configured to, in a first mode of operation, enable communications between devices operated by residents of a controlled environment facility and devices operated by non-residents of the controlled environment facility. The method may also include switching the communication platform from the first mode of operation to an emergency mode of operation. In the emergency mode of operation, the communication platform may be configured to enable an emergency communication from a first device operated by a resident of the controlled environment facility to a second device controlled by emergency response personnel.

Moreover, the communication platform may be configured to disallow inbound communications to the first device in the first mode of operation. The communication platform may be further configured to allow an inbound communication to the first device in the emergency mode of operation. Additionally or alternatively, the communication platform may be configured to, in the first mode of operation, subject the communications to a security protocol. The communication platform may then be configured to, in the second mode of operation, automatically route the emergency communication from the first device to the second device, the emergency communication at least partially not subject to the security protocol.

In certain cases, the resident of the controlled-environment facility may be an inmate, and the controlled-environment facility may be a jail or a prison. Furthermore, the first device may be an analog or digital telephone or a Voice over IP (VOIP) device. In some implementations, prior to switching the communication platform from the first mode of operation to the emergency mode of operation, the method may include receiving a request from the resident to switch the communication platform from the first mode of operation to the emergency mode of operation through the first device. Additionally or alternatively, the method may include receiving the request from prison administrators and/or emergency response personnel.

In another illustrative, non-limiting embodiment, a method may include, in a first mode of operation, routing communications between devices operated by residents of a controlled environment facility and devices operated by non-residents of the controlled environment facility, where the communications may be subject to a security protocol. The method may further include switching to an emergency mode of operation and automatically routing a communication initiated by a first device operated by a resident of the controlled environment facility to a second device by a member of an emergency response team, and the communication may be at least partially not subject to the security protocol.

Also, the method may include disallowing inbound communications to the first device in the first mode of operation, and allowing an inbound communication to the first device in the emergency mode of operation. Additionally or alternatively, in the emergency mode of operation, the method may include automatically routing the communication based, at least in part, upon the location of the first device within the controlled-environment facility such that the second device is selected based, at least in part, upon the location. In some cases, the security protocol may include a three-way calling detection operation. Moreover, the security protocol may include a communication duration allocation.

In certain implementations, the method may include, in the first mode of operation, receiving payment information with respect to communications between the devices operated by the residents of a controlled environment facility and the devices operated by the non-residents of the controlled environment facility. In the emergency mode of operation, however, the method may include routing the communication without receiving payment information. In some cases, the method may also include recording the communication and storing the recorded communication separately from other communications recorded while the communication platform is configured in the first mode of operation. Additionally or alternatively, the method may include protecting the recorded communications from a party that has access to other communications recorded while the communication platform is configured in the first mode of operation.

In yet another illustrative, non-limiting embodiment, a method may include in a first mode of operation, disallowing inbound communications to a device disposed within a controlled-environment facility. The method may also include switching to an emergency mode of operation and allowing an inbound communication to the device. In some implementations, the method may include, in the first mode of operation, enabling outbound communications from devices operated by residents of the controlled environment facility to devices operated by non-residents of the controlled environment facility.

The method may further include, in the first mode of operation, subjecting the outbound communications to a security procedure, and, in the emergency mode of operation, allowing the outbound communications at least partially without regard to the security procedure. In some cases, the inbound communication may include a communication initiated by emergency staff, and wherein the emergency staff is located within the controlled-environment facility.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, a system may include at least one processor and memory coupled to the at least one processor, the memory configured to store program instructions executable by the at least one processor to cause the system to execute one or more operations disclosed herein.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

This specification discloses systems and methods for providing emergency communications within controlled-environment facilities. Various types of controlled environment facilities are present in today's society, and persons may be voluntarily or involuntarily residents of such facilities, whether temporarily or permanently. Examples of controlled environment facilities may include correctional institutions or facilities (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation clinics, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities. For instance, in some of the embodiments discussed below, a controlled environment facility may be referred to as a jail or prison, and its residents may be referred to as arrestees, detainees, or inmates. It should be understood, however, that the systems and methods described herein may be similarly applicable to other types of controlled environment facilities and their respective residents (e.g., a hospital and its patients).

It should also be understood that several examples described below may be capable of providing various types of emergency communications. As used herein, except where accompanying language expressly specifies otherwise, a "communication" is intended to broadly refer to any communication between two or more parties. Thus, "communications" are not limited to telephone calls, but also encompass various other types of communications, including text-based communications, video communications, handheld communication device, etc., unless otherwise stated (e.g., a "telephone communication" or a "telephone call").

Figure 1:
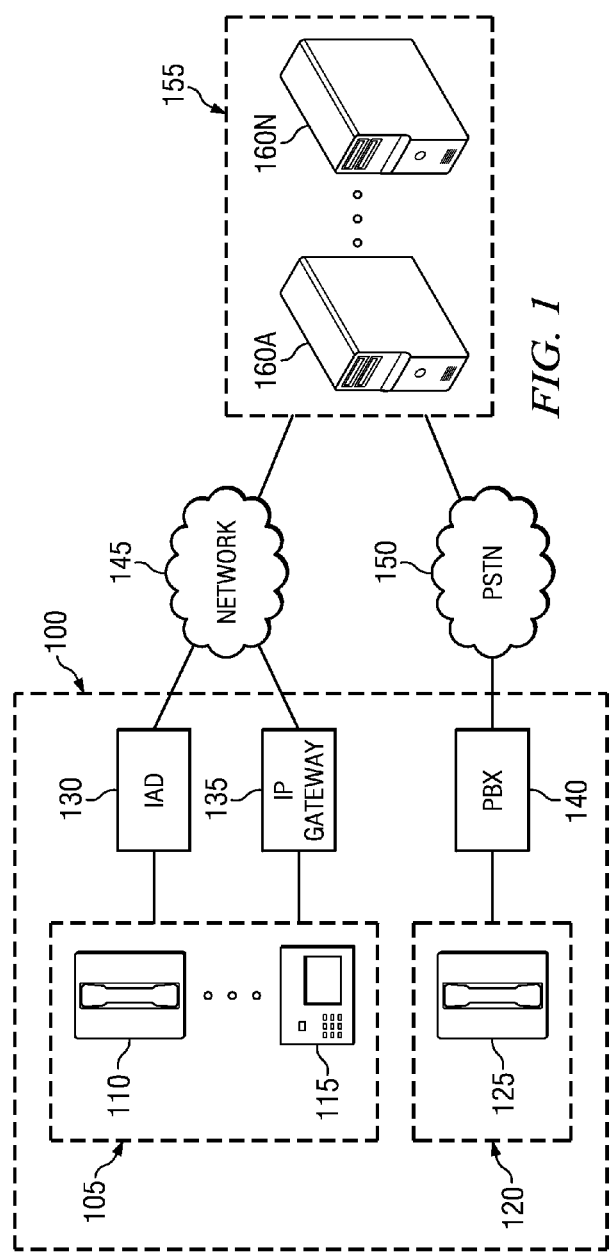
FIG. 1 is a diagram of an environment including a controlled-environment facility communication system according to some embodiments.

Turning now to FIG. 1, a block diagram of an environment including a controlled-environment facility communication system is depicted according to some embodiments. As illustrated, controlled-environment facility 100 (e.g., a prison) includes one or more communication devices 105 accessible to residents of that facility (e.g., inmates). In some cases, communication devices 105 may include analog or digital telephone 110, Voice over IP (VOIP) device 115, or any other suitable communication device (e.g., a videoconferencing system, etc). Prison 100 may also include one more other communication devices 120 accessible to the facility's staff (e.g., prison staff, emergency response personnel, etc.). An example of such communication devices may include telephone 125 or the like. In various embodiments, any number of communication devices 105 and/or 120 may be physically disposed within different areas of the same prison 100. In various embodiments, communication devices 105 may be provided on a person, within a pod, module, cell, wing, service kiosk, visitation area, etc. that is generally accessible to inmates. Conversely, communication device(s) 120 may be placed on a person or in an office, control room, etc. that is generally not accessible to inmates.

One or more of communication devices 110 may be coupled to Integrated Access Device(s) (IAD) 130, which in turn may be configured to converge IP and/or TDM voice and data services, such as, for example, voice, data, video, internet access, text etc. In some embodiments, IAD 130 may include wired and/or wireless connectivity options, routing or switching capabilities, analog and digital voice interfaces, etc. Meanwhile, IP gateway 135 (which may include, for example, an Ethernet Hub or the like) may provide network connectivity to VoIP device 115. In some cases, communication devices 120 may be connected to private and/or public branch exchange (PBX) 140. PBX 140 may manually and/or automatically route inbound and outbound calls to or from devices 120 (e.g., using an extension system or the like).

As shown in FIG. 1, elements 105, 120, 130, 135, and 140 are all physically disposed within prison 100. In alternative embodiments, however, one or more of these elements (e.g., elements 130-140) may be located outside of prison 100. Furthermore, it should be understood that multiple other communication device configurations are possible. For example, communication devices 120 may also include one or more VoIP devices (similar to VoIP device 115) in addition or as an alternative to telephone 125. In those cases, another IP gateway (or IP gateway 135) may be used alternatively or in addition to PBX 140 to provide additional connectivity options to devices 120.

Still referring to FIG. 1, IAD 130 and IP gateway 135 are both connected to network 145. In some cases, network 145 may include the internet. On the other hand, PBX 140 may be connected to public switched telephone network (PSTN) 150. Communication platform 155 may be located remotely from prison 100 and may provide prison communication services to that facility. In alternative embodiments, however, communication platform 155 may be located, at least in part, within prison 100. Further, it should be noted that FIG. 1 shows a single prison 100 connected to a single communication platform 155 for ease of explanation only; however, in other implementations, two or more prisons may be coupled to the same communication platform or a same prison may be connected to two or more communication platforms.

Within communication platform 155, one or more computer systems 160A-N (described in more detail in FIG. 5) may be configured to provide communication services to inmates and/or staff at prison 100. For example, in some embodiments, inmates committed to prison may use one or more of devices 105 to access telephone services. For example, an inmate may initiate telephone services by lifting the receiver on telephone 110. At that time, the inmate may be prompted to provide a personal identification number (e.g., a "PIN") other identifying or biometric information (e.g., fingerprint, voice and/or facial recognition, iris scan, etc.). An interactive voice response (IVR) unit may generate and play a prompt or other message to the inmate. Then, under the control of communication platform 155, device(s) 105 may be connected to a non-resident's (i.e., a person not committed to prison 100) telephone and/or other communication device across PSTN 150 and/or network 145 (e.g., via IAD 130 and/or IP gateway 135).

In some cases, at least a subset of devices 105 may be configured not to receive calls (referred to as "inbound calls") during the ordinary course of the prison's operations. That is, at least a subset of devices 105 may be configured to place calls only ("outbound calls"). In other situations, however, another subset of devices 105 accessible to inmates may be configured for both inbound and outbound communications (e.g., to facilitate a non-resident initiated visitation session, etc.). Generally speaking, devices 120 accessible to prison staff may be configured for both inbound and outbound communications.

In some implementations, devices 105 may also be turned off during certain times (e.g., at night) in the normal course of the prison's operations. Moreover, in various environments devices 105 and/or devices 120 may not have access to conventional 911 and/or other emergency communication services that may be generally available to the non-resident population at large.

Figure 2:
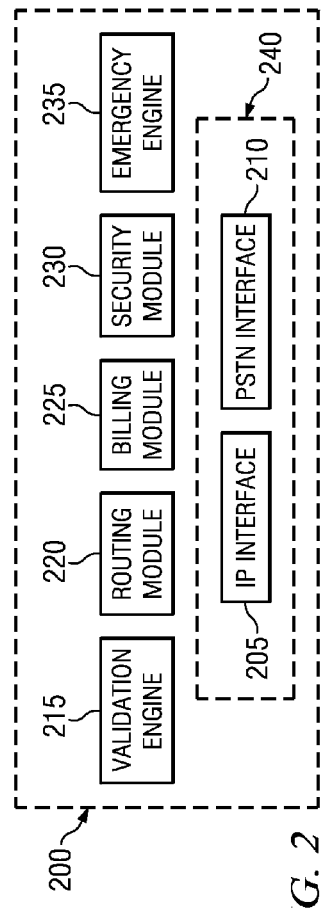
FIG. 2 is a block diagram of communication platform software according to some embodiments.

FIG. 2 is a block diagram of communication platform software according to some embodiments. In some embodiments, software 200 may be executed and/or stored, at least in part, in one or more computer systems 160A-N of communication platform 155. As illustrated, software 200 includes interface 240, which in turn includes IP interface 205 and PSTN interface 210. Software 200 also includes validation engine 215, routing module 220, billing module 225, security module 230, and emergency engine 235.

In a first mode of operation, software 200 may be configured to receive a communication connection request from a given device among devices 105, and validation engine 215 may validate the request. For example, a telephone call or other communication may be received through IP interface 205 or PSTN interface 200 requesting that it be routed to a non-resident's phone or device. As described above, validation 215 may receive an inmate PIN and/or other identification information (e.g., biometric samples), compare the received identification information against a database of such information, and determine whether the communication request should be allowed. In a hypothetical situation, for example, validation engine 215 may determine that the requesting inmate is not allowed to call the requested phone number, in which case it may block the call. Conversely, validation engine 215 may approve the request and communicate routing information to routing module 220, which may in turn effect a connection to the desired (e.g., non-resident) phone number or communication device through IP interface 205 and/or PSTN interface 210.

In some embodiments, during the first mode of operation, the inmate's communication request may also be subject to a billing procedure. Generally speaking, during the normal course of the prison's operations, the inmate may be responsible for paying the costs of a communication, as determined by validation engine 215 and/or billing module 225. Billing module 225 may then be configured to debit or charge a certain amount of money from an account associated with the requesting inmate, such as, for instance, a commissary account, a calling account, a credit card, etc. In some cases, billing module 225 may be configured to collect and process payment information received during, before, and/or after origination of a communication request. Such payment information may be received from the requesting inmate and/or from the non-resident to whom the communication request is directed (e.g., a collect call, prepaid, post paid, text collect, credit card, instant paid, or the like).

Security module 230 may be configured to implement one or more security protocols, for example, while the communication is taking place between an inmate and a non-resident of prison 100. For example, security 230 may be configured to enable live monitoring of the communication (e.g., through devices 120 operated by prison staff), perform 3-way call detection, enforce a maximum call duration allocation or limitation, perform keyword detection, voice recognition, remote call forwarding detection etc. In addition, security 230 may be configured to record the entire communication or at least a portion thereof (e.g., upon detection of a spoken word). More generally, security module 230 may be configured to implement one or more communication security measures or protocols as desired by facility 100 during it normal course of operations.

Emergency engine 235 may be configured to receive an indication that an emergency mode of operation is requested (e.g., by an inmate, prison staff, etc.), and may thereafter change one or more communication features otherwise implemented by software 200 (e.g., a security feature implemented by security module 230). Examples of the various operations that may be implemented by emergency engine 235 are described in more detail below with respect to FIGS. 3 and 4.

In various embodiments, modules 210-260 shown in FIG. 2 may represent sets of software routines, logic functions, and/or data structures that are configured to perform operations described herein. Although these modules are shown as distinct logical blocks, in other embodiments at least some of the functionality provided by these modules may be combined into fewer blocks. Conversely, one or more of blocks 205-240 may be implemented such that each such block is divided among two or more logical blocks. Moreover, although shown with a particular configuration, in other embodiments these various modules may be rearranged in other ways. In certain embodiments, each of the different components of communication platform software 200 may be implemented in an integrated fashion (e.g., on a single server or computer system) or in a distributed fashion (e.g., via a number of discrete systems configured to communicate with one another via a local or wide area network). Additionally or alternatively, the operation of communication platform software 200 may be partitioned into components in a different fashion than illustrated in FIG. 2.

Figure 3:
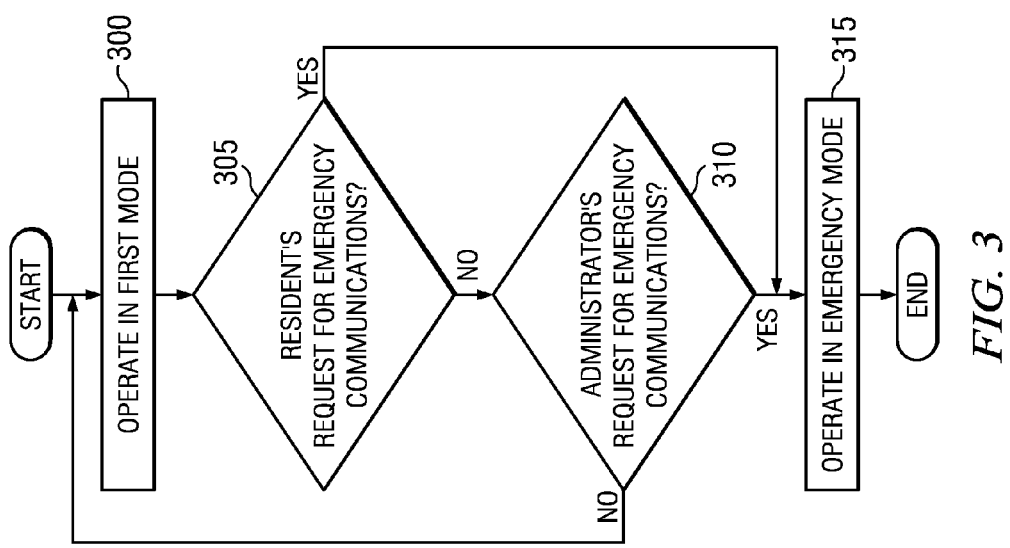
FIG. 3 is a flowchart of a method for a communication platform to switch from a first mode of operation to an emergency mode of operation according to some embodiments.

FIG. 3 is a flowchart of a method for a communication platform to switch from a first mode of operation to an emergency mode of operation according to some embodiments. In various embodiments, the method described in FIG. 3 may be performed by software 200 executed by communication platform 155 under control of emergency engine 235. At block 300, communication platform 155 may be operating in a first mode of operation (e.g., a first mode of operation which, in some cases, may be one of a plurality of various non-emergency modes implemented by platform 155 in the normal course of the prison's operations). At block 305, communication platform 155 may determine whether a resident's (e.g., a prisoner's) request for emergency communication has been received. If not, then at block 310, communication platform may determine whether a prison administration's (e.g., staff, emergency response personnel, etc.) request for emergency communications has been received. If not, communication platform 155 may continue to operate in the first mode of operation. At blocks 305 and 310, if communication platform 155 determines that either a prisoner or an administrator has requested emergency communications, it may begin operating in an emergency mode as per block 315.

In various embodiments, a request for switching from a first mode of operation to an emergency mode of operation may be received at a time when communication devices 105 would otherwise be turned off (e.g., at night). Moreover, the request may be at least partially triggered by violence-related events occurring within prison 100 such as, for example, a riot, an uprising, a hostage situation, a fight among inmates, etc. In other cases, other types of emergency situations (e.g., a fire) may cause the inmate or administrator to also trigger the request. Generally speaking, the request may be issued by one of the inmates within prison 100, by a member of a tactical or emergency response team and/or it may be automatically generated in response to the detection of an emergency condition within prison 100. As an example, a fire or smoke alarm system may trigger a request for communication platform 155 to enter emergency communication mode. As another example, a video surveillance system may automatically detect an emergency situation and may thus transmit a request to communication platform 155. In various scenarios, the request may be transmitted from prison 100 to platform 155 as a message or command sent over network 145 or PSTN 150.

In some cases, communication platform 155 may be configured to accept a request for emergency communication services in response to an inmate entering a special code via communication devices 105 (e.g., 111, 911, *999, etc.). Such a special code may be configurable by prison 100. Further, different codes may be used for emergency communication requests originating from different areas within prison 100. In some embodiments, upon receiving the code from the inmate, platform 155 may initiate communications to prison personnel (e.g., via devices 120) and/or authorities outside of prison 100 (e.g., police) to obtain authorization for granting the inmate's request. In other embodiments, however, platform 155 may switch to its emergency mode of operation without further authorization. In yet other embodiments, upon receiving the request, platform 155 may route the inmate's communication directly to a control room or the like where a member of a tactical response team (or other prison administration personnel) can evaluate the request on a "live" basis. In certain implementations, VoIP device 115 may be used to initiate the emergency communication request, and a video camera or the like within VoIP device 115 may provide a picture or video feed of the requesting inmate and/or of its surroundings, in order to help prison personnel in evaluating the potential emergency situation.

Figure 4:
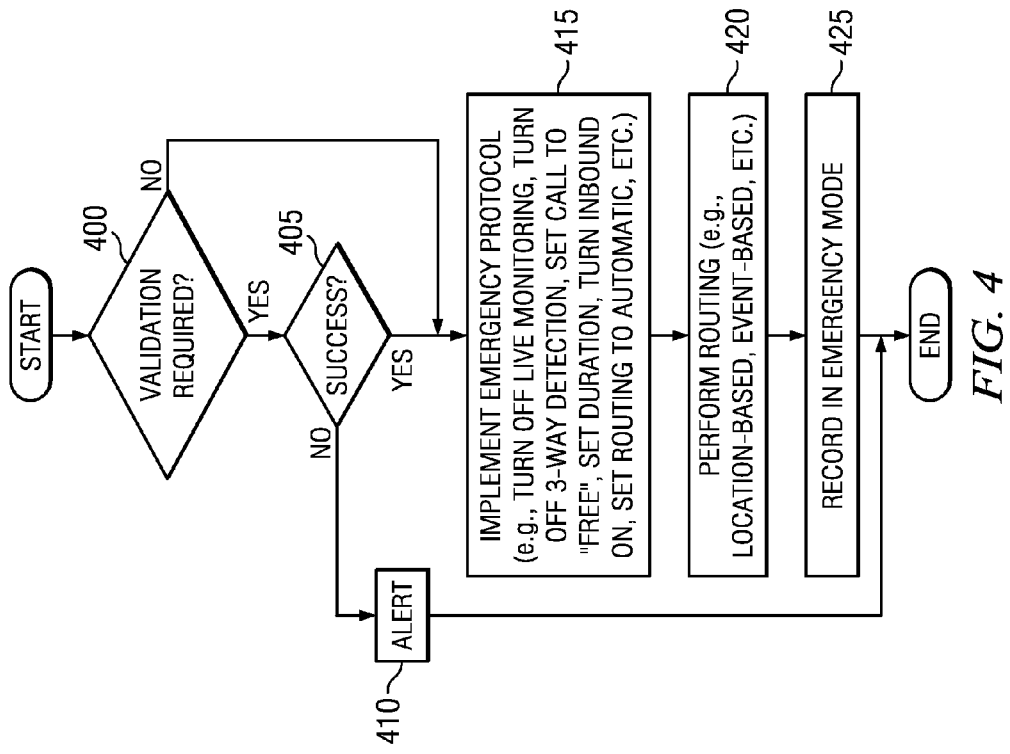
FIG. 4 is a flowchart of a method for providing communication services in an emergency mode of operation according to some embodiments.

FIG. 4 is a flowchart of a method for providing communication services in an emergency mode of operation according to some embodiments. In various embodiments, the method described in FIG. 3 may be performed by software 200 executed by communication platform 155 under control of emergency engine 235. At block 400, platform 155 may determine whether validation is required in connection with having received a request for emergency communication services. If so, a validation process may be performed as previously described. For example, in cases where the request is originated from one of devices 105 under control of an inmate, a validation process my request inmate identification and/or biometric information to determine whether the inmate is authorized to make such a request. Validation engine 215 may, for instance, request that the inmate provide a PIN or biometric information. Additionally or alternatively, validation engine 215 may prompt the inmate to speak his or her name and may record the response. At block 405, the validation process has been a successful one, control pass to block 415; otherwise control passes to block 410. At block 410, an alert may be transmitted to authorities within prison 100 indicating that an inmate has unsuccessfully attempted to initiate emergency communication services.

At block 415, platform may switch from the first mode of operation to the emergency mode of operation by implementing an emergency communication protocol. In various embodiments, such an emergency protocol may be different from a protocol used during the normal course of operations. The emergency protocol of block 415 may at least partially modify one or more features implemented by security module 230. These features may be turned off, for example, to prevent interruption or cancellation of the emergency call.

In some cases, the emergency protocol of block 415 may turn off or bypass a live monitoring feature otherwise provided by platform 155 (e.g., in a first mode of operation) under control of security module 230. Additionally or alternatively, the emergency protocol of block 415 may turn off or bypass a three-way call detection operation also implemented under control of security module 230. Additionally or alternatively, a billing operation provided by billing module 225 may be turned off or bypassed such that the emergency communication is allowed free of charge to requesting inmates or receiving parties. Additionally or alternatively, a maximum time allocation for the communication may be eliminated and/or altered (e.g., increased) so that, during an emergency, the inmate may not have his or her communication cut off short.

As previously noted, devices 105 are not typically enabled to provide inbound communications in the course of the prison's normal operations. In some cases, however, as part of the emergency protocol of block 415, platform 155 may enable inbound communications and make devices 105 addressable by devices 120 and/or other communication devices outside of prison 100, for example, via routing module 220. As such, in a hypothetical emergency scenario where a member of a tactical response team (e.g., a hostage negotiator) may wish to reach a particular inmate and/or a location within prison 100, one or more among devices 120 (and/or other devices outside of prison 100) may be used to initiate communications to those one or more devices 105.

At block 420, communication platform 155 may modify a routing operation that would otherwise be performed by platform 155 during the course of the prison's normal operations. For example, routing module 220 may automatically route communication originated by one or more of devices 105 to one or more of devices 120 directly. Additionally or alternatively, routing module 220 may send a reconfiguration message to PBX 140 instructing it to route certain (or all) communications to particular extension(s) within prison 100. In some embodiments, the routing operations performed by block 220 may be location-based. For example, depending upon the location of an originating emergency request or communication within prison 100, a different device or set of devices among communications 120 (and/or other devices outside of prison 100) may be summoned. In other embodiments, the routing of block 220 may be event-based. For example, depending upon a different type of emergency-triggering event (e.g., fire vs. riot), a different device or set of devices among communications 120 (and/or other devices outside of prison 100) may be connected.

At block 425, an emergency communication initiated during emergency mode may be recorded, for example, via security module 230 of platform 155. For instance, an audio of the communication and/or a call detail record (CDR) may be stored within platform 155. In some cases, however, recording parameters may be different from other recordings obtained in the course of the prison's normal operations. For example, the recorded emergency communication may be stored separately from other recordings. Additionally or alternatively, the recorded emergency communication may be protected and/or encrypted in a manner that provides only a subset of otherwise authorized communication review personnel to access the recording.

In one embodiment, in an emergency situation, the controlled-facility staff configures the communication platform 155 to operate in a first emergency mode. In the first emergency mode, all phones 110, 115 within all or a portion of the controlled-environment facility are monitored by communication platform 155 for an off-hook or call-initiation. Upon detection of such an off-hook condition at resident phone 110 or 115, communication platform 115 automatically establishes a call connection and or the initiation of a recording of the communication and or channel between the resident phone and staff phone 125 without requiring any addition action by the caller at the resident phone. Communication platform 155 opens a channel to the resident phone through IAD 130/IP Gateway 135 and network 145. Communication platform also opens a channel to staff phone 125 through PSTN 150 and PBX 140, including connecting to the proper PBX extension, if any, for staff phone 125. This first emergency mode may be used, for example, in a hostage or riot situation so that if a hostage or rioting resident picks up a resident phone, then a connection and recording initiation is automatically completed to a staff phone in a control station.

In another embodiment, during normal or after-hours operations of the resident telephone system, communication platform 155 may be capable of operating in a second emergency mode when a pre-designated code is dialed on a resident phone 110 or 115. For example, if a resident is victim or a witness to a crime or other emergency situation, the resident may dial the pre-designated code (e.g., 911, 111, etc.) and a channel or call connection will automatically be routed to staff phone 125, which may be associated with a control station, emergency response team, investigator, or counselor. During after-hours operation, the resident phone 110, 115 may appear to the resident as non-operational (i.e., no dial tone, DMTF tones, etc.) until the pre-designated code is entered.

In some cases, two or more different emergency modes of operation may be provided. For example, for a first type of emergency (e.g., riot vs. fire, number in inmates involved, etc.), a first emergency mode of operation may implement or modify a first set of security features otherwise provided by communication platform 155 in a particular manner. In a second type of emergency situation, a second emergency mode of operation may implement or modify a second set of security features otherwise provided by communication platform 155 in a different manner. To this end, two or more emergency mode profiles may be stored under control of emergency engine 235 and implemented as needed.

Figure 5:
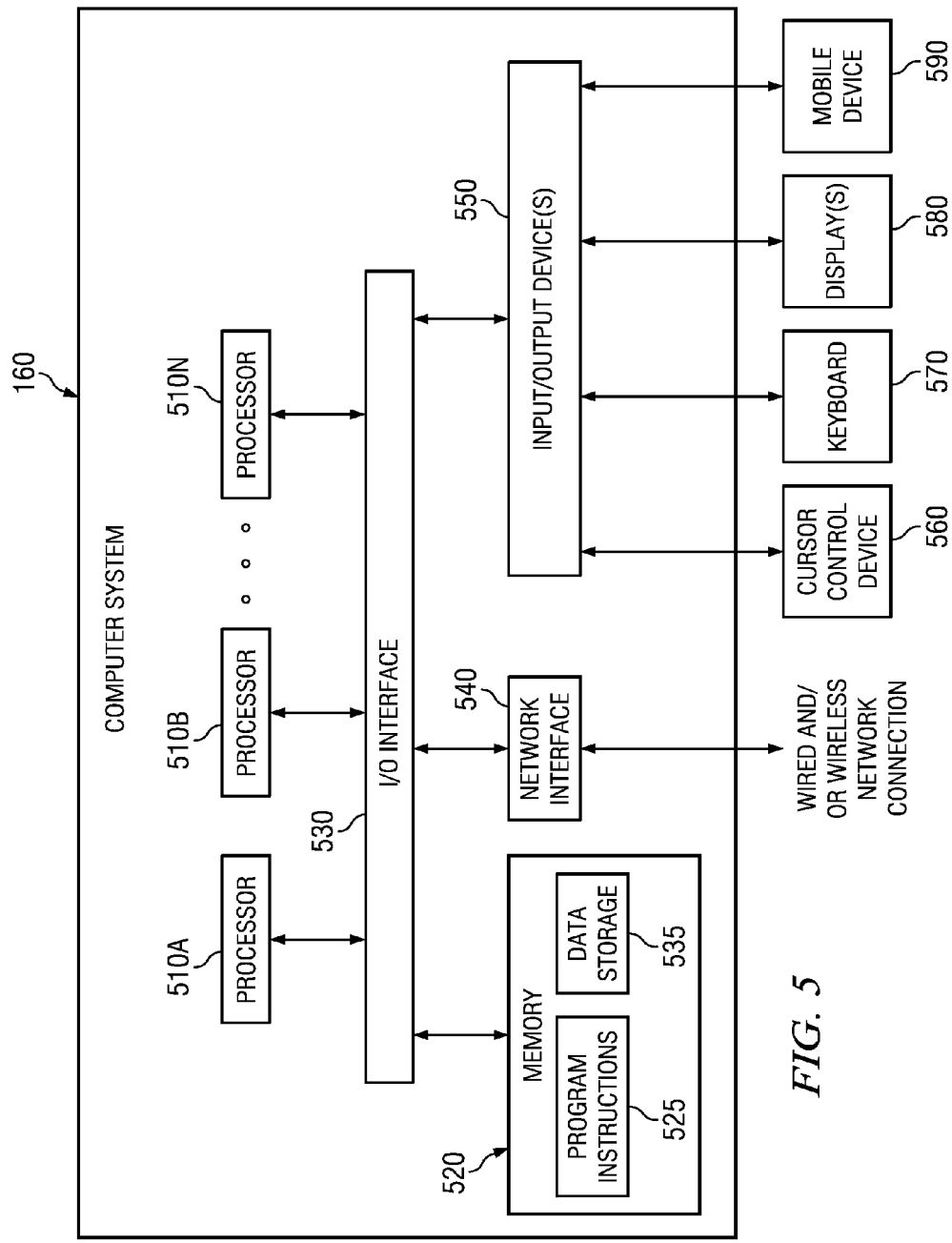
FIG. 5 is a block diagram of a computer system configured to implement various systems and methods described herein according to some embodiments.

As noted above, embodiments of systems and methods for providing emergency communications within controlled-environment facilities may be implemented or executed by one or more computer systems 160A-N. One such system is illustrated in FIG. 5. In various embodiments, system 160 may be a server, a mainframe computer system, a workstation, a network computer, a desktop computer, a laptop, mobile device, or the like. In different embodiments, these various systems may be configured to communicate with each other in any suitable way, such as, for example, via a local area network or the like.

As illustrated, computer system 160 includes one or more processors 510 coupled to a system memory 520 via an input/output (I/O) interface 530. Computer system 160 further includes a network interface 540 coupled to I/O interface 530, and one or more input/output devices 550, such as cursor control device 560, keyboard 570, display(s) 580, and/or mobile device 590. In some embodiments, communication platform 155 may be implemented using a single instance of computer system 160, while in other embodiments multiple such systems, or multiple nodes making up computer systems 160A-N, may be configured to host different portions or instances of software 200 shown in FIG. 2. For example, in an embodiment, some elements of software 200 may be implemented via one or more nodes of computer system 160A-N that are distinct from those nodes implementing other elements (e.g., a first computer system may implement billing module 225 and another computer system may implement emergency engine 235).

In various embodiments, computer system 160 may be a single-processor system including one processor 510, or a multi-processor system including two or more processors 510 (e.g., two, four, eight, or another suitable number). Processors 510 may be any processor capable of executing program instructions. For example, in various embodiments, processors 510 may be general-purpose or embedded processors implementing any of a variety of instruction set architectures (ISAs), such as the x85, PowerPC®, ARM®, SPARC®, or MIPS® ISAs, or any other suitable ISA. In multi-processor systems, each of processors 510 may commonly, but not necessarily, implement the same ISA. Also, in some embodiments, at least one processor 510 may be a graphics processing unit (GPU) or other dedicated graphics-rendering device.

System memory 520 may be configured to store program instructions and/or data accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described above in connection with FIGS. 3-5, may be stored within system memory 520 as program instructions 525 and data storage 535, respectively. In other embodiments, program instructions and/or data may be received, sent or stored upon different types of computer-accessible media or on similar media separate from system memory 520 or computer system 160. Generally speaking, a computer-accessible medium may include any tangible storage media or memory media such as magnetic or optical media—e.g., disk or CD/DVD-ROM coupled to computer system 160 via I/O interface 530. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 540.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. In addition, in some embodiments some or all of the functionality of I/O interface 530, such as an interface to system memory 520, may be incorporated directly into processor 510.

Network interface 540 may be configured to allow data to be exchanged between computer system 160 and other devices attached to a network, such as other computer systems, or between nodes of computer system 160. In various embodiments, network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 550 may, in some embodiments, include one or more display terminals, keyboards, keypads, touchpads, scanning devices, voice or optical recognition devices, mobile devices, or any other devices suitable for entering or retrieving data by one or more computer system 160. Multiple input/output devices 550 may be present in computer system 160 or may be distributed on various nodes of computer system 160. In some embodiments, similar input/output devices may be separate from computer system 160 and may interact with one or more nodes of computer system 160 through a wired or wireless connection, such as over network interface 540.

As shown in FIG. 5, memory 520 may include program instructions 525, configured to implement certain embodiments described herein, and data storage 535, comprising various data accessible by program instructions 525. In an embodiment, program instructions 525 may include software elements of embodiments illustrated in the above figures. For example, program instructions 525 may be implemented in various embodiments using any desired programming language, scripting language, or combination of programming languages and/or scripting languages (e.g., C, C++, C#, Java™, JavaScript™, Perl, etc.). Data storage 535 may include data that may be used in these embodiments (e.g., recorded communications, profiles for different modes of operations, etc.). In other embodiments, other or different software elements and data may be included.

A person of ordinary skill in the art will appreciate that computer system 160 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

The various systems and methods illustrated in the figures and described herein represent example embodiments of systems and methods for providing emergency communications within controlled-environment facilities. These techniques may be implemented in software, hardware, or a combination thereof. The order in which each operation of a given method is performed may be changed, and various elements of the systems illustrated herein may be added, reordered, combined, omitted, modified, etc. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

The invention claimed is:

1. A method, comprising: performing, by one or more computer systems, providing a communication platform configured to, in a first mode of operation, enable communications between devices operated by residents of a controlled environment facility and devices operated by non-residents of the controlled environment facility; and switching the communication platform from the first mode of operation to an emergency mode of operation, the communication platform configured to, in the emergency mode of operation, enable an emergency communication from a first device operated by a resident of the controlled environment facility to a second device controlled by emergency response personnel, the communication platform configured to, in the first mode of operation, subject the communications to a security protocol, the communication platform further configured to, in the second mode of operation, automatically route the emergency communication from the first device to the second device, the emergency communication at least partially not subject to the security protocol.

2. The method of claim 1, the communication platform configured to disallow inbound communications to the first device in the first mode of operation, and the communication platform further configured to allow an inbound communication to the first device in the emergency mode of operation.

3. The method of claim 1, wherein the resident of the controlled-environment facility is an inmate, and wherein the controlled-environment facility is a jail or a prison.

4. The method of claim 1, wherein the first device is an analog telephone.

5. The method of claim 1, wherein the first device is a Voice over IP (VOIP) telephone or device.

6. The method of claim 1, further comprising, prior to switching the communication platform from the first mode of operation to the emergency mode of operation,
performing, via one or more computer systems,
receiving a request from the resident to switch the communication platform from the first mode of operation to the emergency mode of operation through the first device.

7. The method of claim 1, further comprising, prior to switching the communication platform from the first mode of operation to the emergency mode of operation,
performing, via one or more computer systems,
receiving a request from the emergency response personnel to switch the communication platform from the first mode of operation to the emergency mode of operation.

8. A system, comprising:
at least one processor; and
a memory coupled to the at least one processor, the memory configured to store program instructions executable by the at least one processor to cause the system to:
in a first mode of operation, route communications between devices operated by residents of a controlled environment facility and devices operated by non-residents of the controlled environment facility, the communications subject to a security protocol; and
switch to an emergency mode of operation, the system configured to, in the emergency mode of operation, automatically route a communication initiated by a first device operated by a resident of the controlled environment facility to a second device controlled by a member of an emergency response team, the communication at least partially not subject to the security protocol.

9. The system of claim 8, the system configured to disallow inbound communications to the first device in the first mode of operation, and the system further configured to allow an inbound communication to the first device in the emergency mode of operation.

10. The system of claim 8, the system configured to, in the emergency mode of operation, automatically route the communication based, at least in part, upon the location of the first device within the controlled-environment facility such that the second device is selected based, at least in part, upon the location.

11. The system of claim 8, the security protocol including a 3-way calling detection operation.

12. The system of claim 8, the security protocol including a communication duration allocation.

13. The system of claim 8, the system configured to, in the first mode of operation, receive payment information with respect to communications between the devices operated by the residents of a controlled environment facility and the devices operated by the non-residents of the controlled environment facility, the system further configured to, in the emergency mode of operation, route the communication without receiving payment information.

14. The system of claim 8, the program instructions executable by the at least one processor to further cause the system to:
record the communication; and
store the recorded communication separately from other communications recorded while the communication platform is configured in the first mode of operation.

15. The system of claim 8, the program instructions executable by the at least one processor to further cause the system to:
record the communication; and
protect the recorded communication from a party that has access to other communications recorded while the communication platform is configured in the first mode of operation.

16. A non-transitory tangible computer-readable storage medium having program instructions stored thereon that, upon execution by one or more computer systems, cause the one or more computer systems to:
in a first mode of operation, disallow inbound communications to a device disposed within a controlled-environment facility and subject the communications to a security protocol; and
switch to an emergency mode of operation, the one or more computer systems configured to, in the emergency mode of operation, allow an inbound communication to the device, and automatically route the emergency communication from the device to a second device, the emergency communication at least partially not subject to the security protocol.

17. The non-transitory tangible computer-readable storage medium of claim 16, wherein the program instructions, upon execution by the one or more computer systems, further cause the one or more computer systems to:
in the first mode of operation, enable outbound communications from devices operated by residents of the controlled environment facility to devices operated by non-residents of the controlled environment facility.

18. The non-transitory tangible computer-readable storage medium of claim 17, wherein the program instructions, upon execution by the one or more computer systems, further cause the one or more computer systems to:
in the first mode of operation, subject the outbound communications to a security procedure; and
in the emergency mode of operation, allow the outbound communications at least partially without regard to the security procedure.

19. The non-transitory tangible computer-readable storage medium of claim 16, wherein the inbound communication includes a communication initiated by emergency staff, and wherein the emergency staff is located within the controlled-environment facility.

* * * * *